United States Patent
Boudreau et al.

(10) Patent No.: US 10,360,603 B2
(45) Date of Patent: *Jul. 23, 2019

(54) CREATION AND USE OF CONSTRAINT TEMPLATES

(71) Applicant: International Business Machines Corporation, Armonk, NY (US)

(72) Inventors: Michael K. Boudreau, Orange, CA (US); Jamie B. Marsnik, Minneapolis, MN (US); Bradley T. Moore, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 851 days.

This patent is subject to a terminal disclaimer.

(21) Appl. No.: 14/841,931

(22) Filed: Sep. 1, 2015

(65) Prior Publication Data

US 2015/0371297 A1    Dec. 24, 2015

Related U.S. Application Data

(62) Division of application No. 12/845,420, filed on Jul. 28, 2010, now Pat. No. 9,230,273.

(51) Int. Cl.
*G06Q 30/06* (2012.01)
*G06Q 40/00* (2012.01)

(52) U.S. Cl.
CPC ......... *G06Q 30/06* (2013.01); *G06Q 30/0603* (2013.01); *G06Q 30/0607* (2013.01); *G06Q 30/0621* (2013.01); *G06Q 40/12* (2013.12)

(58) Field of Classification Search
CPC ........ G06Q 30/06; G06Q 40/12; G06Q 30/04; G06Q 30/0621; G06Q 2220/18
USPC ....................................................... 705/26.5
See application file for complete search history.

(56) References Cited

U.S. PATENT DOCUMENTS

| | | |
|---|---|---|
| 5,666,411 A | 9/1997 | McCarty |
| 6,023,763 A | 2/2000 | Grumstrup et al. |
| 6,029,145 A | 2/2000 | Barritz et al. |
| 6,502,124 B1 | 12/2002 | Shimakawa et al. |
| 6,810,389 B1 | 10/2004 | Meyer |
| 7,069,595 B2 | 6/2006 | Cognigni et al. |
| 7,516,090 B2 | 4/2009 | Agarwal |
| 7,653,452 B2 | 1/2010 | Sauermann et al. |
| 7,676,437 B2 | 3/2010 | Satkunanathan et al. |

(Continued)

OTHER PUBLICATIONS

Iwarere, U.S. Appl. No. 14/729,108, Office Action dated Nov. 17, 2015, 28 pages.

(Continued)

*Primary Examiner* — Luna Champagne
(74) *Attorney, Agent, or Firm* — Jay Wahlquist; Madeline F. Schiesser; Keohane & D'Alessandro PLLC

(57) ABSTRACT

The new creation and use of entitlement constraint templates methods and systems can be linked to software offerings in a software catalog. Allowing software catalog experts to link contractual entitlement data with software product offerings via constraint templates on such a varying list of constraint types, establishes a highly robust software catalog knowledgebase. The result is significant cost savings in terms of time spent inputting entitlement constraint data by contract analysts as well as minimizing errors by those analysts who would otherwise be required to have a very high level of expertise in the software offerings while potentially inputting the same constraint data repeated times.

4 Claims, 9 Drawing Sheets

(56) References Cited

U.S. PATENT DOCUMENTS

| | | |
|---|---|---|
| 7,831,956 B2 | 11/2010 | Kimmerly |
| 7,853,609 B2 | 12/2010 | Dehghan et al. |
| 8,307,355 B2 | 11/2012 | Capomassi et al. |
| 8,359,566 B2 | 1/2013 | Chaar et al. |
| 8,489,920 B2 | 7/2013 | Rippingale |
| 8,694,434 B1 | 4/2014 | Kley |
| 9,122,998 B2 | 9/2015 | Boudreau et al. |
| 9,230,273 B2 | 1/2016 | Boudreau et al. |
| 2002/0111922 A1 | 8/2002 | Young et al. |
| 2002/0169625 A1 | 11/2002 | Yang et al. |
| 2003/0023966 A1 | 1/2003 | Shimizu et al. |
| 2003/0028786 A1 | 2/2003 | Mustafa |
| 2004/0225524 A1 | 11/2004 | Narasimhan et al. |
| 2004/0249756 A1 | 12/2004 | Garibay et al. |
| 2004/0254888 A1 | 12/2004 | Tanaka et al. |
| 2004/0267590 A1 | 12/2004 | Clark et al. |
| 2005/0086174 A1 | 4/2005 | Eng |
| 2005/0102240 A1 | 5/2005 | Misra et al. |
| 2005/0216420 A1 | 9/2005 | Padole et al. |
| 2006/0073890 A1 | 4/2006 | McAllister et al. |
| 2006/0092861 A1 | 5/2006 | Corday et al. |
| 2006/0155711 A1 | 7/2006 | Jackson et al. |
| 2006/0184932 A1 | 8/2006 | Burnley et al. |
| 2007/0043679 A1 | 2/2007 | Le et al. |
| 2007/0061799 A1 | 3/2007 | Kimmerly |
| 2007/0240154 A1 | 10/2007 | Gerzymisch et al. |
| 2007/0245235 A1 | 10/2007 | Singh et al. |
| 2007/0294179 A1 | 12/2007 | Krawetz |
| 2008/0163092 A1 | 7/2008 | Rao |
| 2008/0243629 A1 | 10/2008 | Chang et al. |
| 2008/0320607 A1 | 12/2008 | Richardson |
| 2009/0037336 A1 | 2/2009 | Sunata |
| 2009/0098936 A1 | 4/2009 | Lawrence et al. |
| 2009/0158438 A1 | 6/2009 | Pichetti et al. |
| 2009/0228982 A1 | 9/2009 | Kobayashi |
| 2009/0228984 A1 | 9/2009 | Sterin |
| 2009/0248428 A1 | 10/2009 | Disciascio et al. |
| 2010/0100778 A1 | 4/2010 | Sullivan |
| 2010/0325734 A1 | 12/2010 | Etchegoyen |
| 2011/0113493 A1 | 5/2011 | Moore |
| 2012/0030072 A1 | 2/2012 | Boudreau et al. |
| 2012/0030073 A1 | 2/2012 | Boudreau et al. |
| 2015/0269694 A1 | 9/2015 | Boudreau et al. |

OTHER PUBLICATIONS

Iwarere, Oluseye, U.S. Appl. No. 14/729,108, Notice of Allowance, dated Feb. 3, 2017, 7 pages.

Champagne, U.S. Appl. No. 12/845,420, Notice of Allowance dated Aug. 25, 2015, 20 pages.

Iwarere, Oluseye, U.S. Appl. No. 14/729,108, Final Office Action dated May 31, 2016, 22 pages.

Luna Champagne, USPTO Office Action, U.S. Appl. No. 12/845,420, dated Mar. 9, 2012, 13 pages.

Luna Champagne, USPTO Final Office Action, U.S. Appl. No. 12/845,420, dated Jul. 2, 2012, 11 pages.

Luna Champagne, USPTO Office Action, U.S. Appl. No. 12/845,420, Notification Date Jun. 30, 2014, 16 pages.

Luna Champagne, USPTO Office Action, U.S. Appl. No. 12/845,420, Notification Date Sep. 18, 2014, 19 pages.

Luna Champagne, USPTO Notice of Allowance and Fee(s) Due, U.S. Appl. No. 12/845,420, dated Mar. 11, 2015, 17 pages.

Oluseye Iwarere, USPTO Office Action, U.S. Appl. No. 12/845,227, Notification Date Mar. 28, 2013, 17 pages.

Oluseye Iwarere, USPTO Final Office Action, U.S. Appl. No. 12/845,227, Notification Date Oct. 17, 2013, 12 pages.

Oluseye Iwarere, USPTO Office Action, U.S. Appl. No. 12/845,227, Notification Date Feb. 24, 2014, 13 pages.

Oluseye Iwarere, USPTO Final Office Action, U.S. Appl. No. 12/845,227, Notification Date May 19, 2014, 15 pages.

Oluseye Iwarere, USPTO Office Action, U.S. Appl. No. 12/845,227, Notification Date Oct. 8, 2014, 17 pages.

IBM, "Software Inventory Validation Tool", IP.com No. IPCOM000175050D, Oct. 3, 2008, 3 pages.

Authors et al.: Disclosed Anonymously, "Method to check software license compliance in virtualized environments", IP.com No. IPCOM000195549D, May 5, 2010, 5 pages.

John Cronin et al., "System for Tracking and Enforcing Software Licenses", IP.com No. IPCOM000180768D, Mar. 16, 2009, 6 pages.

IBM, "Licensing of pricing models with flexible characteristics", IP.com No. IPCOM000143165D, Nov. 14, 2006, 4 pages.

Oluseye Iwarere, USPTO Notice of Allowance, U.S. Appl. No. 12/845,227, Notification Date Apr. 20, 2015, 12 pages.

Luna Champagne, USPTO Notice of Allowance and Fee(s) Due, U.S. Appl. No. 12/845,420, dated Aug. 25, 2015, 20 pages.

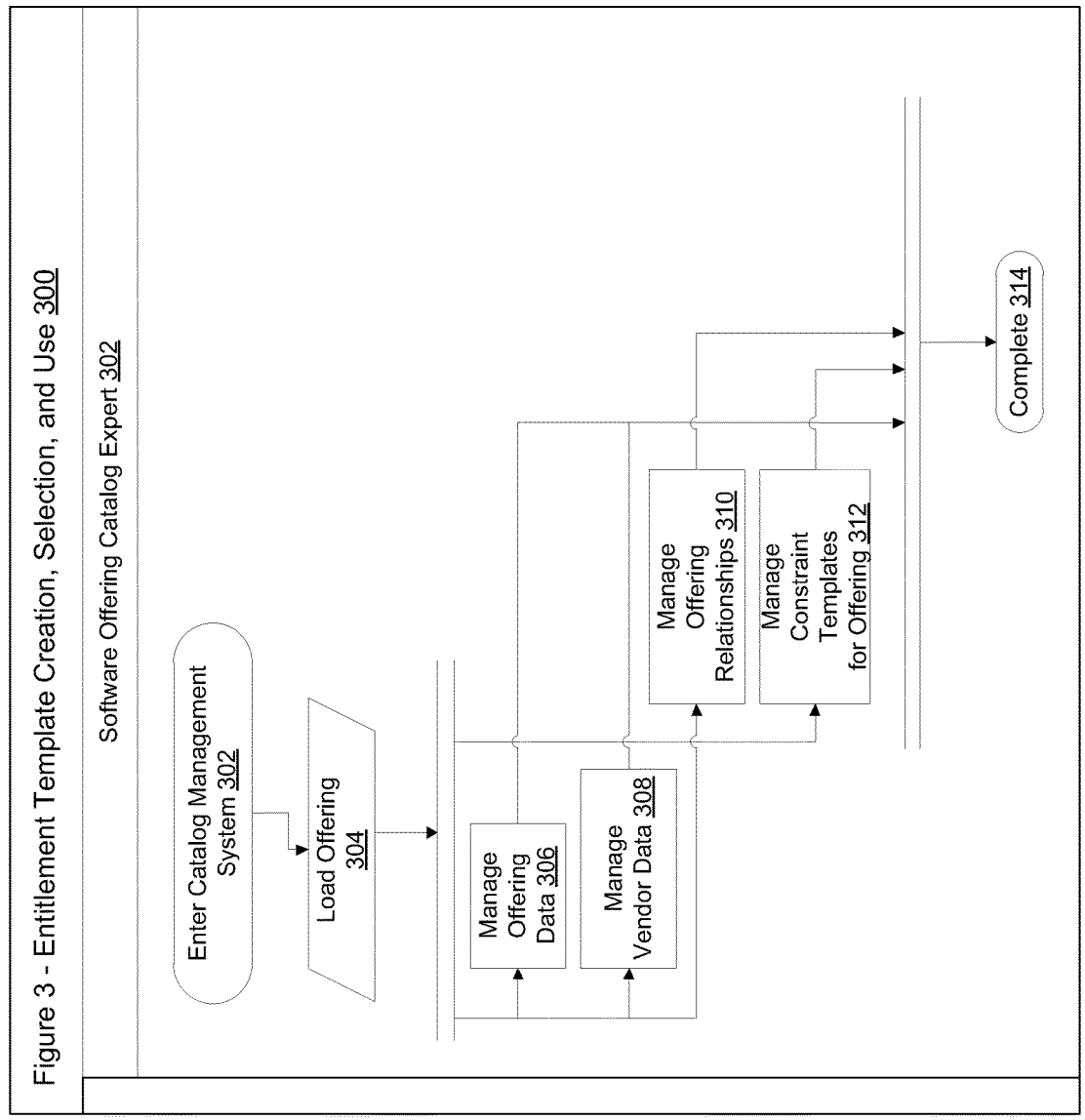
Figure 3 - Entitlement Template Creation, Selection, and Use 300

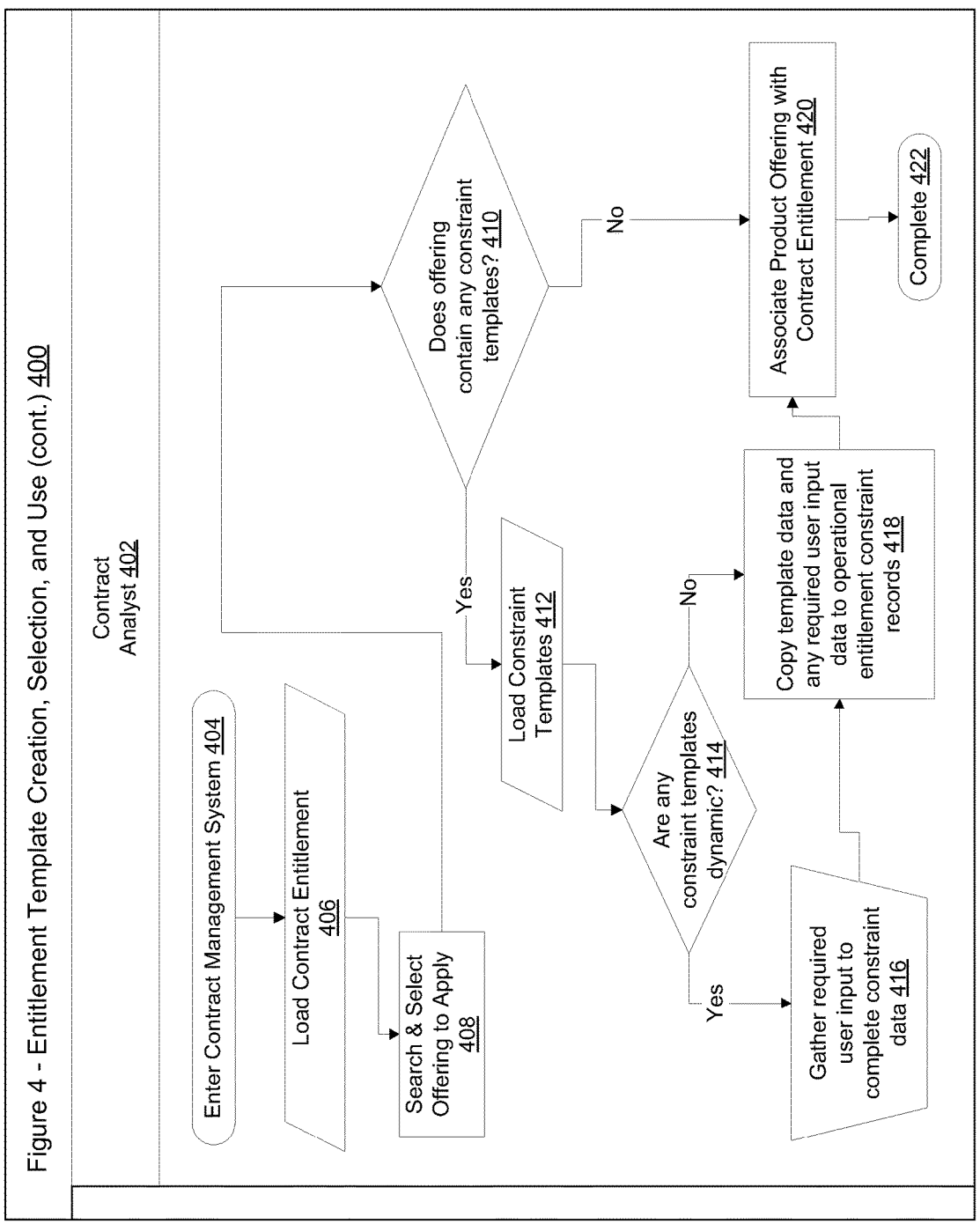

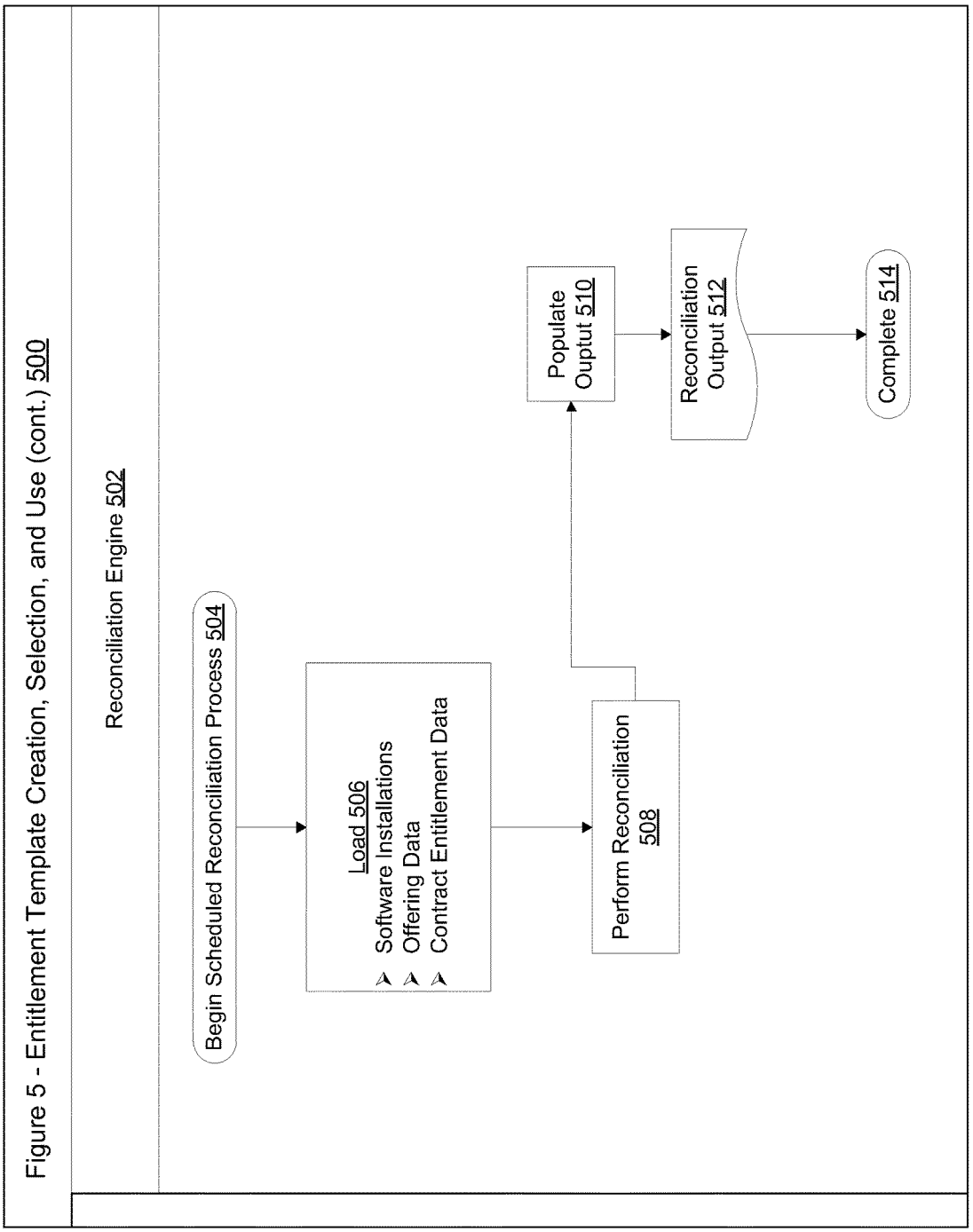
Figure 5 - Entitlement Template Creation, Selection, and Use (cont.) 500

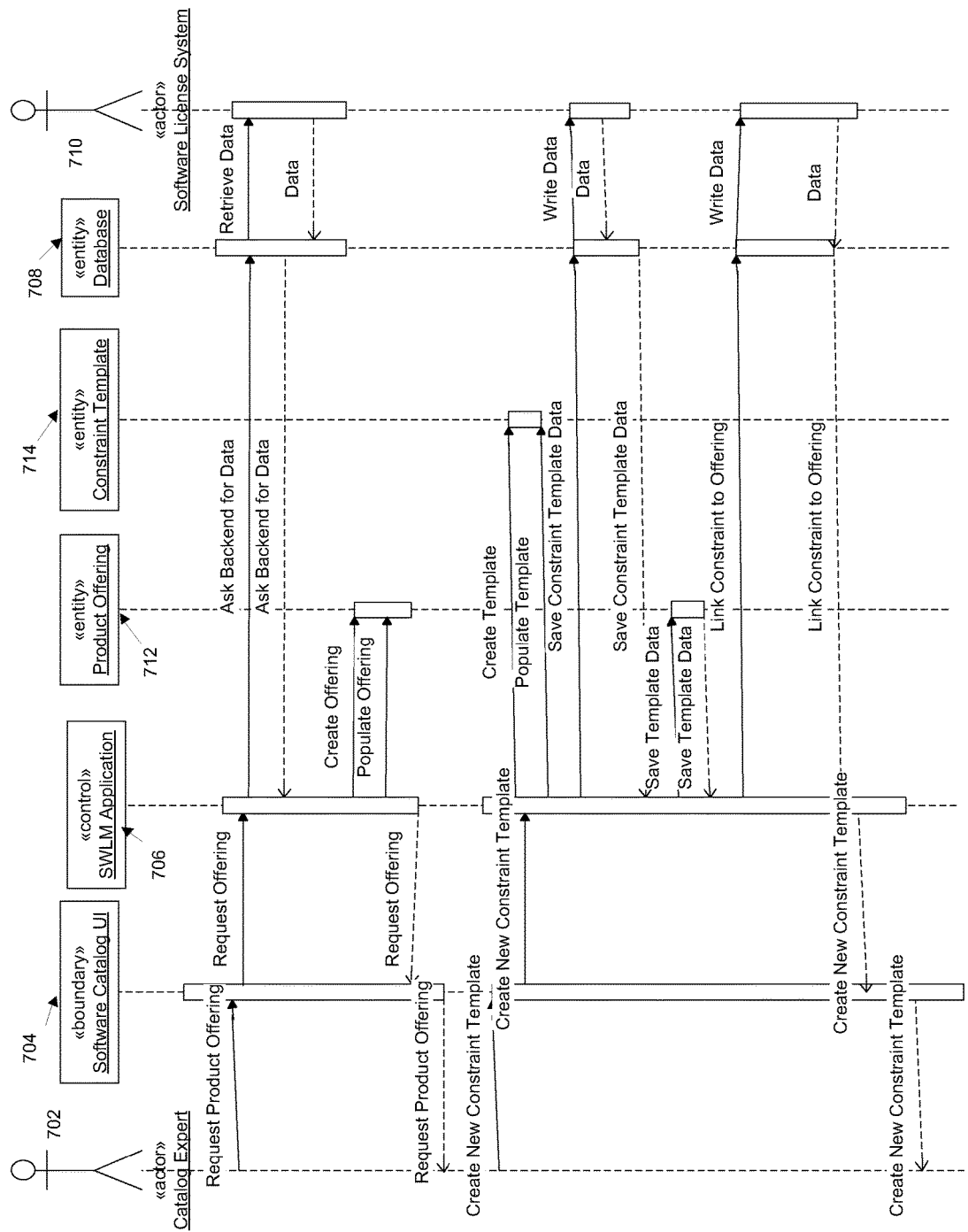
Figure 7 - Create Template Sequence 1 700

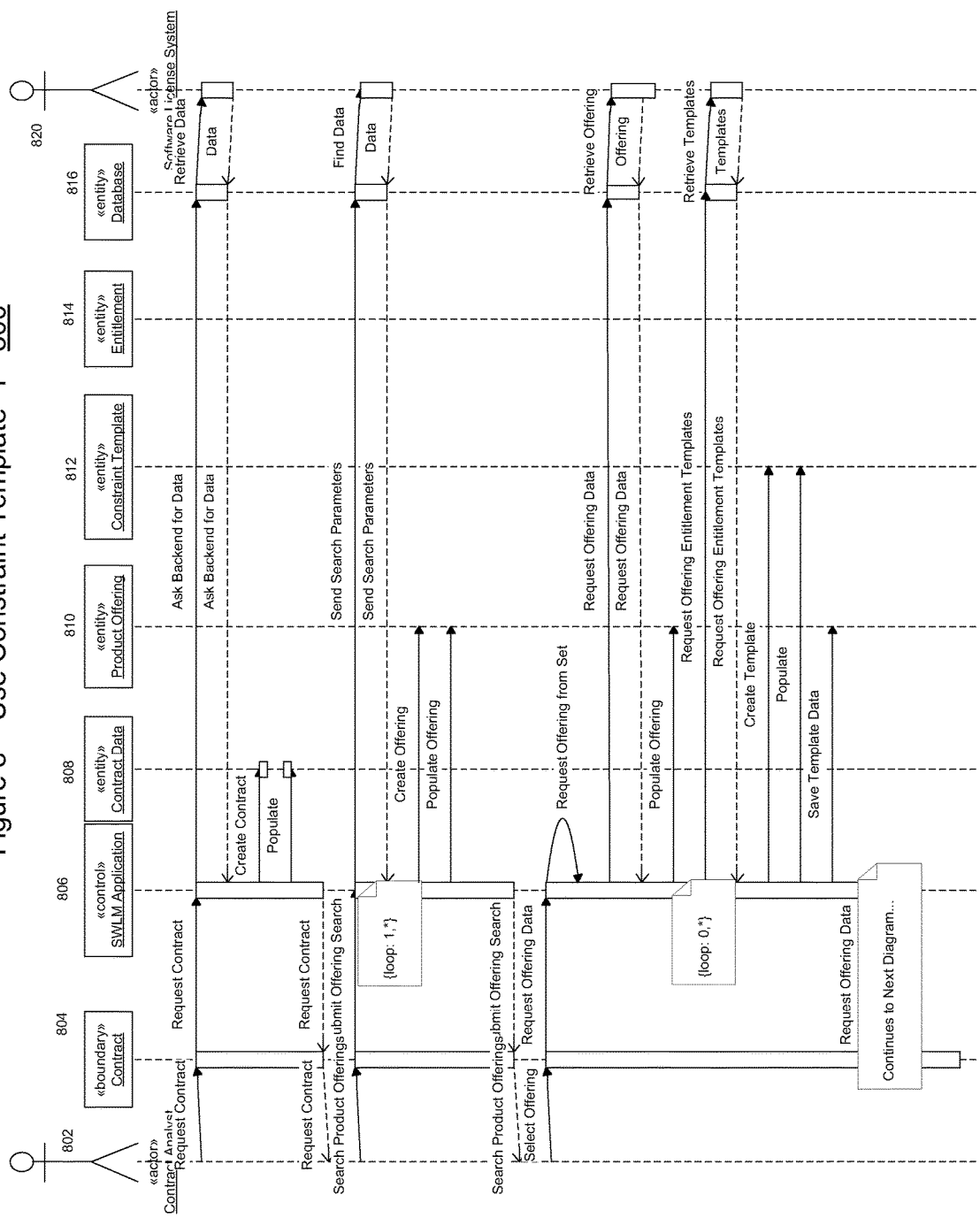
Figure 8 – Use Constraint Template 1 – 800

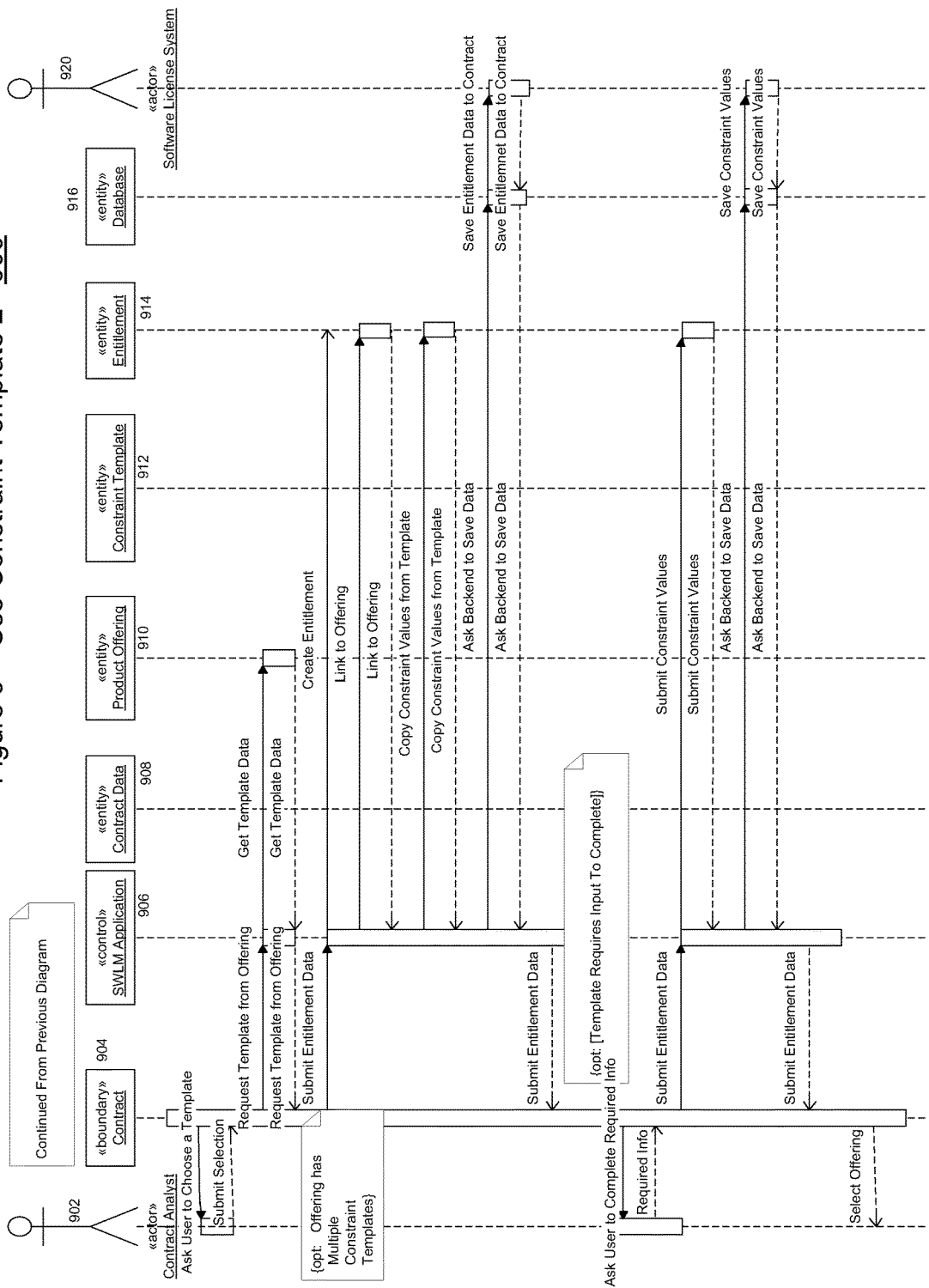

US 10,360,603 B2

CREATION AND USE OF CONSTRAINT TEMPLATES

CROSS-REFERENCE TO RELATED APPLICATIONS

The present patent document is related to commonly-owned and co-pending U.S. patent application Ser. No. 12/845,227, filed on Jul. 28, 2010 and entitled "CATALOG-BASED SOFTWARE LICENSE RECONCILIATION", the disclosure of which is incorporated herein by reference. The present patent document is also related to commonly-owned and co-pending U.S. patent application Ser. No. 14/729,108, filed on Jun. 3, 2015 and entitled "CATALOG-BASED SOFTWARE LICENSE RECONCILIATION", the disclosure of which is incorporated herein by reference. The present patent document is also a divisional of commonly-owned and co-pending U.S. patent application Ser. No. 12/845,420, filed on Jul. 28, 2010 and entitled "CREATION AND USE OF CONSTRAINT TEMPLATES", the disclosure of which is incorporated herein by reference.

FIELD OF THE INVENTION

Aspects of the present invention provide for a method and a system for linking a software offering containing multiple pieces of software application code to a set of constraint templates that are available for use by a contract analyst at the time the contractual data is entered into a software license management system.

BACKGROUND OF THE INVENTION

Software contract analysts input contract entitlement data into a software license management system. Entitlement data comprises of a software offering linked to one or more entitlement constraints. Oftentimes, a software offering may have one or more possible known combinations of entitlement constraints that may be able to be preconfigured. In current software license management systems, these entitlement constraints are entered at the time the contractual data is entered prior to reconciliation or after the reconciliation process has run. In the first case, contract analysts are required to have a high level of expertise and possibly have to enter the constraint repeated times. In the second case, entering constraint data as a result of a reconciliation process creates a static, inflexible link between a piece of software application code and a constraint.

What are needed are a system and method for linking a software offering containing multiple pieces of software application code to a set of constraint templates that are available for use by a contract analyst at the time the contractual data is entered into a software license management system.

Therefore, there exists a need for a solution that solves at least one of the deficiencies of the related art.

SUMMARY OF THE INVENTION

The present invention may comprise a method for linking a software offering containing multiple pieces of software application code to a set of constraint templates that are available for use by a contract analyst at the time the contractual data is entered into a software license management system.

This invention involves the creation and use of entitlement constraint templates that can be linked to software offerings in a software catalog. Allowing software catalog experts to link contractual entitlement data with software product offerings via constraint templates on such a varying list of constraint types, establishes a highly robust software catalog knowledge base. The result is significant cost savings in terms of time spent inputting entitlement constraint data by contract analysts as well as minimizing errors by those analysts who would otherwise be required to have a very high level of expertise in the software offerings while potentially inputting the same constraint data repeated times.

The present invention may comprise a method of creating a constraint template in a system comprising receiving a request for an offering, retrieving data, creating an offering, populating the offering with product offering data, creating a new constraint template, populating the new constraint template with one or more constraints, and linking the one or more constraints to the offering.

The present invention may further comprise a method for using an entitlement template comprising requesting a contract, searching product offerings within the contract, collecting product offering data, choosing a template from the offering, linking entitlements to the offering, and selecting an offering.

The present invention may further comprise a computer-readable medium storing computer instructions, which, when executed, enables a computer system operating with a contract management system and a contract management system together with associated databases to perform a method comprising receiving a request for an offering, retrieving data, creating an offering, populating the offering with product offering data, creating a new constraint template, populating the new constraint template with one or more constraints, and linking the one or more constraints to the offering.

The present invention may even further comprise a method for deploying a software license reconciliation engine server for use in a computer system for using an entitlement template comprising: requesting a contract, searching product offerings within the contract, collecting product offering data, choosing a template from the offering, linking entitlements to the offering, and selecting an offering.

The present invention may further comprise a system for a web-based application to allow software catalog experts to assign entitlement constraints to a software product offering comprising: an entitlement templates database connected to a contract management system and to a catalog management system, the entitlement templates database configured to store a set of entitlement constraint templates linking a set of entitlement constraints to a set of software offerings, wherein a subset of the entitlement constraints are defined by a software catalog expert; a contract data database connected to the contract management system, the contract data database configured to store contractual entitlement data, wherein the data is managed at least once by the software catalog expert; the catalog management system configured to return at least one of the set of software offerings and linked set of entitlement constraints from the set of entitlement constraint templates based on the contractual entitlement data, wherein the catalog management system configured to receive a request for a software offering from the at least one of the set of software offerings; the contract management system configured to link the returned software offering to a contract associated with the contractual entitlement data after the software offering has been linked to a set of entitlement constraints, wherein entitlement constraints not previously defined by the software catalog expert are received in the entitlement constraint template associated with the returned software offering; a reconciliation engine configured to determine if any of the entitlement constraint templates are dynamic, and in the case that no entitlement constraint templates are dynamic, the reconciliation engine configured to copy template data and any required user input data to operational entitlement constraint records, and, in the case that any of the constraint templates are dynamic, reconciliation engine configured to gather required user input to complete constraint data and to copy entitlement constraint template data and any required user input data to operational entitlement constraint records; and a product offering database connected to the catalog management system, the product offering database configured to associate the software offering with the contract.

BRIEF DESCRIPTION OF THE DRAWINGS

These and other features of this invention will be more readily understood from the following detailed description of the various aspects of the invention taken in conjunction with the accompanying drawings in which:

FIGS. 3-5 show an Entitlement Template Creation, Selection and Use workflow (method) of the present invention.

FIG. 7 illustrates a create constraint template method of the present invention.

FIGS. 8 and 9 illustrate Use Constraint Template method.

DETAILED DESCRIPTION OF THE DRAWINGS

Figure 1:
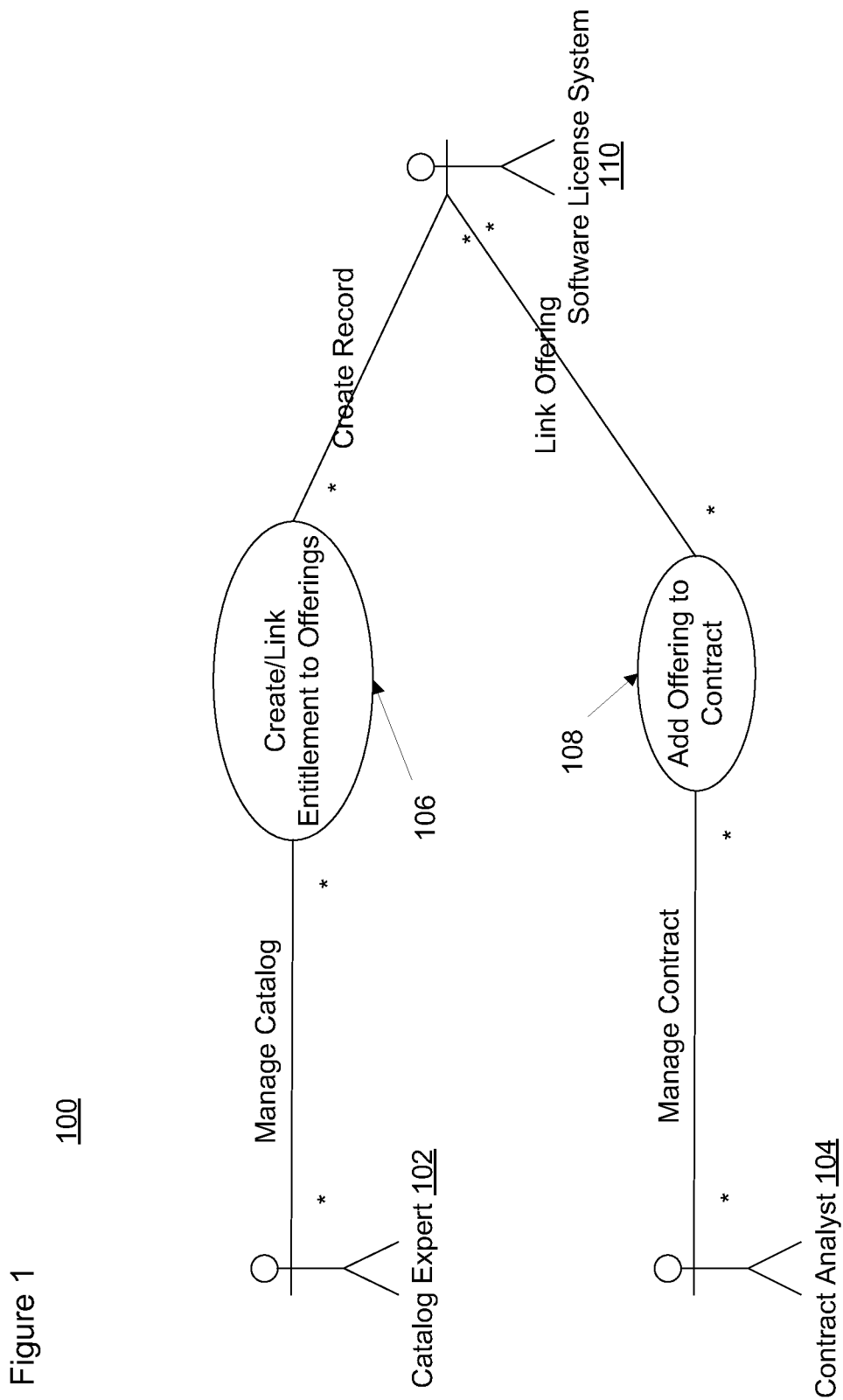
FIG. 1 illustrates a high level view of an embodiment of the system of the present invention.

The present invention, which meets the needs identified above, provides a system and method for linking a software offering containing multiple pieces of software application code to a set of constraint templates that are available for use by a contract analyst at the time the contractual data is entered into a software license management system.

The present invention utilizes a web-based application to allow software catalog experts to assign entitlement constraints to a software product offering. A software product offering can be defined as a grouping of one or more software applications that can be installed together with at least one of the software applications being required to be installed to be considered a valid offering. By definition, a software product offering also contains license conditions for the software application being installed. The same software application can be installed under different license conditions (such as development or production) which would cause the purchaser of the license to purchase a different software offering. These license conditions are what we call entitlement constraints. Entitlement constraints can be capacity counts, hardware attribute mappings (i.e., MIPS, serial number, location, environment, etc.), or reconciliation processing directives.

In the asset management industry, and more specifically software license management, software catalogs and contractual data such as entitlement constraints are kept separate. Typically, contract analysts who input contractual data choose a product offering and then manually input and assign applicable entitlement constraints. In many cases, software offerings come with known constraints. This invention aims to unite the product offerings with all known entitlement constraints via entitlement constraint templates.

Software catalog experts create any and all known entitlement constraints on appropriate offerings in the software catalog. The expert can decide whether to fully configure each constraint or to leave open certain attributes that would be either required or optional to be filled out when this offering is chosen for use by a contract analyst. The software catalog expert can also define a selection of constraint templates a contract analyst would choose from for a given offering that match a particular vendor's possible purchase configurations. In the examples below, there are three constraint template groupings that would correspond to the offering an analyst could pick, and then each template within the grouping are the vendor's possible purchase configurations.

Software contract analysts input contractual entitlement data into the system. When the analysts do this, they have the opportunity to choose preconfigured software offerings containing fixed or dynamic entitlement constraints. If a given software offering contains multiple entitlement constraint template groupings, the analyst would be required to choose one. Each template grouping can have multiple constraint templates applicable to a given offering. If the chosen entitlement constraint templates have required fields that are incomplete, the analyst would be required to complete those fields prior to the offering being available for use.

Upon selection of a software offering, the offering is then linked to the contract the analyst is working with. If the offering contains constraint templates, the template data is copied into the operational contract entitlement constraint area along with any dynamic values the user provided upon selection.

FIG. 1 illustrates a high level view of an embodiment of System 100 of the present invention having Catalog Expert 102 and Contract Analyst 104. It further has a Software Catalog manager 106 where Catalog Expert 102 may manage the catalog and create and link entitlements to offerings and thereby create records for Software License System 110. It further has a Contract Manager 108 where Contract Analyst 104 may manage contracts, add a contract to an offering and further to link an offering to the contract and sending to Software License System 110.

Figures 2, 200:
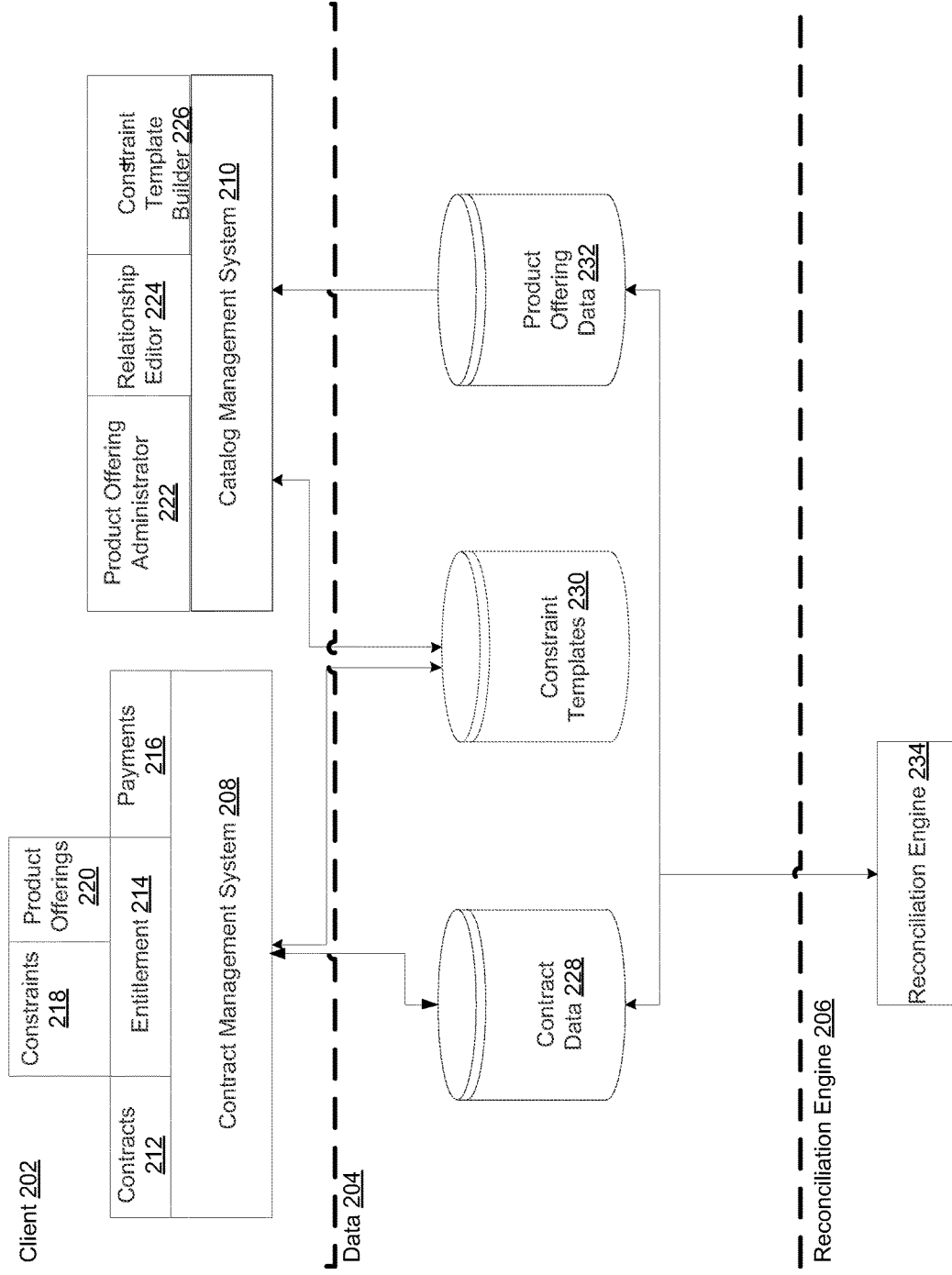
FIG. 2 illustrates the system of the present invention.

FIG. 2 illustrates System diagram 200 having Client 202, Data element 204, and Reconciliation Engine 206. Client 202 has Contract Management System 208 that allows a contract analyst (such as Contract Analyst 104 in FIG. 1) to manage contracts, add a contract to an offering and further to link an offering to contract and Catalog Management System 210 that allows a catalog expert (such as Catalog Expert 102) to manage the catalog and create and link entitlements to offerings and thereby create records linking offerings with entitlements. Communicating with Contract Management System 208 are Contracts element 212 for providing details of a contract to Contract Management System 208, Entitlement element 214 for providing details of entitlements to Contract Management System 208, and Payments element 216 for providing details of payments required to Contract Management System 208. Communicating with Entitlement element 214 are Constraints element 218 for providing details of the constraints of the contract to Entitlement element 214, and Product Offering element 220 for providing details of the offerings of the contract to Entitlement element 214.

Communicating with Catalog Management System 210 are Product Offering Administrator 222 which administrates the catalogs within Catalog Management System 210, Relationship Editor 224 which manages the relationships of offerings within Catalog Management System 210, and Constraint Builder Template 226 which allows templates for constraints to be built within Catalog Management System 210. Constraint templates are provided to Contract Analyst 104 (FIG. 1) once an offering or contract is selected to reduce errors. Constraints may be linked to offerings and to contracts so that once a contract or offering is selected, all of the offerings available, having different configurations, are provided to Contract Analyst 104 (FIG. 1) so that selection error may be avoided and much money and time may be saved.

Data element 204 may have Contract Data database 228 for receiving/sending data from/to Contract Management System 208 and storing the data associated with the contracts. Data element 204 may further have Entitlement Templates database 230 for communicating with Contract Management System 208 and to Catalog Management System 210 and for storing entitlement template data, and Product Offering Data Database 232 connected to Catalog Management System 210 for storing product offering data. "Entitlement", for purposes of this document, may mean all of the products and constraints (legal restrictions) for a particular vendor. For instance, if the offering vendor, e.g., Oracle International Corporation, has an offering such as Oracle WebCenter Suite 11g, different configurations available are provided to the Contract Analyst 104 (FIG. 1) for the enterprise that Contract Analyst 104 (FIG. 1) works for so that selection error may be avoided and much money and time may be saved.

Reconciliation Engine 206 has Reconciliation Engine element 234 for communicating with Contract Data database 228 and with Product Offering Data database 232. Reconciliation Engine 206 is described in greater detail in a commonly-owned patent application filed on Jul. 28, 2010, having U.S. patent application Ser. No. 12/845,227, and entitled "Catalog-Based Software License Reconciliation", as noted in paragraph 0001 of the present document. Reconciliation Engine element 234 may utilize a software rule-based catalog (Catalog Management System 210) to produce accurate license reconciliation across a wide range of software configurations. This rule-based approach provides powerful advantages to software license management, including labor savings through automatic reconciliation, and cost savings through accurate license calculations, software reuse and bundle handling, cost optimization and identification of unusable software installations.

FIGS. 3-5 show an Entitlement Template Creation, Selection and Use workflow (method) 300 (FIG. 3) having Software Offering Catalog Expert 302 for performing the method. At 308, Software Offering Catalog Expert 302 enters Catalog Management System (Catalog Management System 208 in FIG. 2) at 308. Software Offering Catalog Expert 302 loads offering into Catalog Management System 208 (FIG. 2) at 310. At 312, the offering data is managed by Software Offering Catalog Expert 302. At 314, the vendor data is managed by Software Offering Catalog Expert 302. At 316, the constraint data for offering is managed by Software Offering Catalog Expert 302. The management of the data may comprise reading, editing, updating, deleting, etc., the data as appropriate by Software Offering Catalog Expert 302. The method 300 ends at 320.

FIG. 4 shows an Entitlement Template Creation, Selection and Use workflow (method continued) 400 that may occur concurrently with method 300 having Contract Analyst 402 who enters Contract Management System (Contract Management System 208 in FIG. 2) at 404, and loads contract entitlement data at 406. Contract entitlement data may comprise license terms (constraints, i.e., actions that can't be taken, and entitlements, i.e., actions that are allowed) associated with the software artifacts. For example, the license terms (constraints and entitlements) may be that the artifacts are bundled, unbundled, tied to a particular machine (physical constraint), to be used only in development or in staging/production (environmental constraint) or may relate to counting (e.g., having an entitled installation count specifying the number of entitled installations of the software programs for the software offering or a number of copies authorized). At 408, Contract Analyst 402 searches and selects an offering to apply. During the selection process, the system (System 200 in FIG. 2) may provide Contract Analyst 402 with a constraint template, if one exists, for the user comprising the selected offering and available constraint options from the offering vendor, so that data may not be input incorrectly by Contract Analyst 402 thereby making the process less error prone.

At 410, it is determined whether the selected offering has any constraint templates associated therewith and, if not, the offering is associated with the contract entitlement data at 420 and the method ends at 422. If the selected offering has constraint templates associated therewith, at 412, the constraint templates are loaded. At 414, it is determined whether any of the templates are dynamic (a dynamic constraint requires Contract Analyst 402 input) and, if so, at 416, required user input is gathered from Contract Analyst 402 to complete constraint data. If not or if so, the method (process 400) continues to 418 where template data and any required user input data is copied to operational entitlement constraint records. As discussed above, the offering is associated with the contract entitlement data at 420 and the method ends at 422.

FIG. 5 shows an Entitlement Template Creation, Selection and Use workflow (method continued) 500 having Reconciliation Engine 502 that begins a reconciliation process at 504 that may be scheduled. Software installations, offering data and contract entitlement data are loaded into Reconciliation Engine 502 at 506. Reconciliation is performed at 508, the output is populated at 510, and the reconciliation output is reported at 512. The method is completed at 514.

Figure 6:
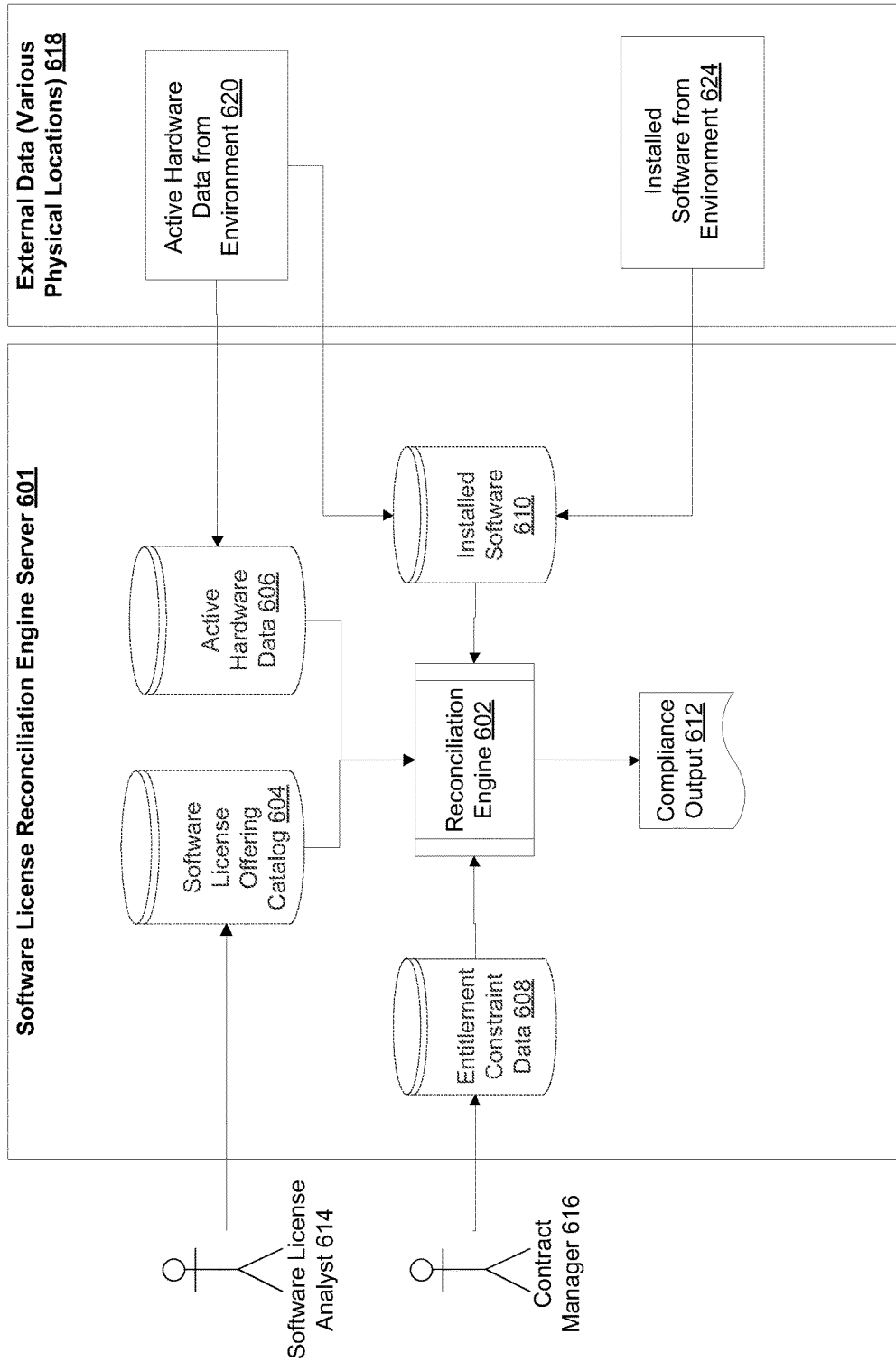
FIG. 6 illustrates a software license reconciliation system utilized by the system of the present invention

FIG. 6 illustrates Software License Reconciliation System 600 of the present invention having a Software License Reconciliation Engine Server 601 and External Data 618 perhaps stored in various physical locations. Software License Reconciliation Engine Server 601 has Software License Offering Catalog database 604 for storing a software license offering catalog, an Active Hardware Data database 606 for storing discovered active hardware data, Entitlement Constraint Data database 608 for storing entitlement constraint data, Installed Software database 610 for storing discovered, installed software data and Reconciliation Engine 602 for receiving inputs from these sources and providing Compliance Output 612.

External Data 618 provides Active Hardware Data database 606 with discovered active hardware data from Environment 620 identifying all of the discovered active hardware in the environment. Active hardware is identified using, for example, a hardware scanner. One example of a hardware scanner is IBM Tivoli Monitoring 6.1 software. Installed Software from Environment 624 provides all installed software as identified by, for instance, a software scanner, to Installed Software database 610.

Software License Analyst 614 accesses Software License Offering Catalog database 604 for selecting and purchasing/licensing software offerings for installation/use in the environment of interest. Appropriate attributes are set or reset and the artifacts from the licensed software offerings are installed in the environment and, subsequently, detected by, for example, a scanner and are uploaded to Installed Software database 610.

Contract Manager 616 accesses Entitlement Constraint database 608 for entering the entitlement constraints on the software offerings. This is generally done when the software offering is made available on Software License Offering Catalog 604.

Reconciliation Engine 602 receives inputs from Software License Offering Catalog 604, Active Hardware Data database 606, Installed Software database 610, and Entitlement Constraint Data database 608 for, among other things, determining which of the installed software are entitled and which are not and producing Compliance Output 612.

FIG. 7 illustrates a Create Constraint Template 1 method 700 having Catalog Expert «actor» 702 requesting a product (software) offering from Software Catalog User Interface (UI)«boundary» 704 that, in turn, passes the request for a product (software) offering to SWLM Application 706. Notations like «this» indicate roles in a modeling language, such as the Unified Modeling Language (UML). Unified Modeling Language (UML) is a standardized general-purpose modeling language in the field of software engineering. The standard is managed, and was created by, the Object Management Group. In such a model, each role has defined obligations, authorities, abilities to speak to particular other roles, etc.

SWLM (Software License Management System) Application 706 requests backend data from Database 708 «entity» that, in turn, retrieves data from Software License System «actor» 710. Software License System 710 returns data to Database 708 for returning to SWLM Application 706. SWLM Application 706 creates an offering and populates the offering with the backend data, and creates the offering with Product Offering «entity» 712 and sends an offering request to Software Catalog UI 704 that, in turn, sends a product (software) offering response to Catalog Expert 702.

Catalog Expert 702 creates a new constraint template request through Software Catalog UI 704 to Constraint Template «entity» 714. SWLM Application 706 populates the constraint template and saves the constraint template data to Software License System 710 through Database 708 that, in turn, verifies the data save to SWLM Application 706 through Database 708. SWLM Application 706 saves template data to Product Offering 712 and links constraint to offering with Software License System 710 through Database 708 receiving data from Database 708 and the new constraint template is created through SWLM Application 706 and then to Catalog Expert 702.

FIG. 8 illustrates Use Constraint Template method 1 800 (continued on FIG. 9—Use Constraint Template method 2 900) where Contract Analyst «actor» 802 requests a contract from Contract «boundary» 804 that relays the request to SWLM Application «control» 806 (SWLM Application 706 in FIG. 4). SWLM Application 806 forwards that request to Database «entity» 816 for retrieving data from Software License System «actor» 820. Once the backend data is collected and passed back to SWLM Application 806 through Database 816, SWLM Application 806 creates a contract with Contract Data «entity» 808 and populates the contract with Contract Data 808. A contract request response is returned to Contract Analyst 802 through Contract 804.

Contract Analyst 802 requests a search product offering from Contract 804 that relays the request to SWLM Application 806. SWLM Application 806 forwards that request to Database 816 sending search parameters to Software License System 820. Once the product offering data is collected and passed back to SWLM Application 806 through Database 816 (that process may be looped multiple times to accumulate the product offering data), SWLM Application 806 creates a product offering with Product Offering «entity» 810 and populates the product offering with Product Offering 810. A product offering search request response is returned to Contract Analyst 802 through Contract 804.

Contract Analyst 802 selects an offering from Contract 804 that relays the request for offering data to Database 816 for retrieving the offering from Software License System 820. Once the offering is collected and passed back to SWLM Application 806 to Database 816 and the offering is populated at Product Offering 810 and SWLM Application 806 requests offering entitlement templates from Database 816 that gathers the templates from Software License System 820 which are relayed to SWLM Application 806, the process may be looped multiple times to accumulate the offering entitlement templates. SWLM Application 806 creates and populates a template with Constraint Template «entity» 812 and saves the template data with Product Offering 810. Method 800 continues to Create Enhancement method 2 900 (FIG. 9).

Create Enhancement method 2 900 (FIG. 9)—continued from Create Enhancement method 1 800 (FIG. 8). Contract Analyst 902 asks a user to choose a template that gets forwarded to SWLM Application 906 through Contract 904 to Product Offering 910 which returns template data to Contract 904 through SWLM Application 906. Contract 904 submits entitlement data to Entitlement «entity» 914 through SWLM Application 906 which links the entitlement data to the offering with Entitlement 914. SWLM Application 906 copies constraint values from the template to Entitlement 914 and SWLM Application 906 requests for the backend data to be saved from Database 916 that forwards to Software License System 920. After the entitlement data is submitted to Contract 904, Contract 904 determines whether user input is required and, if so, required input is received from Contract Analyst 902 by Contract 904. Contract 904 submits the entitlement data to Entitlement 914 and requests that the constraint values be stored by Software License System 920 and a select offering notice is sent to the Contract Analyst 902.

Examples of offering entitlement constraint templates are shown below in Table 1 illustrating the potential cost savings associated therewith:

TABLE 1

Software Offering Entitlement Constraint Template Examples
(ballpark estimates on cost figures)

Constraint Template Group 1
1a) Offering: Microsoft SQL Server Enterprise Edition 2003 Processor License Entitles you to install: Microsoft SQL Server Relational DBMS
Static Constraint: Production Environment
Static Constraint: Web facing system
Static Constraint: DR systems marked compliant without consuming a license
Typically initial license costs about $120k per server (4 processor server)
1b) Offering: Microsoft SQL Server Enterprise Edition 2003 Hostname License Entitles you to install: Microsoft SQL Server Relational DBMS
Static Constraint: Production Environment
Static Constraint: Non Web facing system
Static Constraint: DR systems marked compliant without consuming a license
Dynamic Constraint: Requires companion Client Access License (for each unique user accessing the SQL Server)
Typically initial license costs about $10k per server plus a companion license (range of an additional $2-$20k estimated)
1c) Offering: Microsoft SQL Server Enterprise Edition 2003

Entitles you to install: Microsoft SQL Server Relational DBMS
Static Constraint: Non Production Environment
Dynamic Constraint: Counts of Users
Typically initial license costs about $3k per user, since the licenses are driven by user and
not servers, an additional server will not generate additional licensing costs
Constraint Template Group 2
2a) Offering: Microsoft Server Enterprise Edition 2003 hostname license Entitles you to install: Microsoft Server Enterprise Edition 2003
Static Constraint: Production Environment
Static Constraint: Counts are per hostname, for virtualized systems add up hostnames per serial (not counting the master) divide by 4 and round up to the nearest whole number
Static Constraint: DR systems marked compliant without consuming a license
Dynamic Constraint: Requires companion Client Access License (for each unique user accessing the windows server)
Typically initial license costs about $3k
2b) Offering: Microsoft Server Datacenter Edition 2003 processor license Entitles you to install: Microsoft Server Enterprise Edition 2003
Static Constraint: Production Environment
Static Constraint: Web facing systems
Static Constraint: Counts are per processor for each hostname
Static Constraint: DR systems marked compliant without consuming a license
Typically initial license costs about $12k (4 processor server)
2c) Offering: Microsoft Server Enterprise Edition 2003

Entitles you to install: Microsoft Server Enterprise Edition
Static Constraint: Non Production Environment
Dynamic Constraint: Counts of Users
Typically initial license costs about $3k per user, since the licenses are driven by user and
not servers, an additional server will not generate additional licensing costs
Constraint Template Group 3
3a) Offering: IBM DB2 UDB Enterprise Server Edition Entitles you to install: IBM DB2 UDB Enterprise Server Edition, DB2 Client
Static Constraint: Production Environment
Static Constraint: DR systems consume 100 processor value units per serial
Static Constraint: Counts are per serial number, for virtualized systems add up processors per serial, use the pvu calculation to determine the number of processor value units required per serial
Static Constraint: Base product = IBM DB2 UDB Enterprise Server Edition, consumption of a license cannot occur unless the base product exists.
Typically initial license costs about $130k per server (4 processor server)
3b) Offering: IBM DB2 UDB Enterprise Server Edition Entitles you to install: IBM DB2 UDB Enterprise Server Edition, DB2 Client
Static Constraint: Non Production Environment
Static Constraint: Counts are per distinct user in the entire development/test environment
Typically initial license costs about $4k per user, since the licenses are driven by user and
not servers, an additional server will not generate additional licensing costs It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for linking a software offering containing multiple pieces of software application code to a set of constraint templates that are available for use by a contract analyst at the time the contractual data is entered into a software license management system, it is understood that the invention further provides various alternative embodiments. For example, in one embodiment, the invention provides a computer-readable/useable medium that includes computer program code to enable a system for linking a software offering containing multiple pieces of software application code to a set of constraint templates that are available for use by a contract analyst at the time the contractual data is entered into a software license management system.

To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for linking a software offering containing multiple pieces of software application code to a set of constraint templates that are available for use by a contract analyst at the time the contractual data is entered into a software license management system. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of: (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code, or notation, of a set of instructions intended to cause a computing device having an information processing capability to perform a particular function either directly before or after either or both of the following: (a) conversion to another language, code, or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for determining, collecting, and aggregating the reputation of a party from various sources. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for a web-based application to allow software catalog experts to assign entitlement constraints to a software product offering comprising:
   a contract management system;
   a catalog management system;
   an entitlement templates database connected to the contract management system and to the catalog management system;
   a contract data database connected to the contract management system;
   a reconciliation engine;
   a product offering database connected to the catalog management system;
   a memory medium comprising instructions;
      a bus coupled to the memory medium; and
      a processor, coupled to the reconciliation engine, that when executing the instructions causes the system to:
      store, in the entitlement templates database, a set of entitlement constraint templates linking a set of entitlement constraints to a set of software offerings, wherein a subset of the entitlement constraints are defined by a software catalog expert;
      store, in the contract data database, contractual entitlement data, wherein the data is managed at least once by the software catalog expert;
      receive, at the catalog management system, a request for a software offering from at least one of the set of software offerings;
      return, by the catalog management system, the at least one of the set of software offerings and a linked set of entitlement constraints from the set of entitlement constraint templates based on the contractual entitlement data;
      link, by the contract management system, the returned software offering to a contract associated with the contractual entitlement data after the software offering has been linked to a set of entitlement constraints, wherein entitlement constraints not previously defined by the software catalog expert are received in the entitlement constraint template associated with the returned software offering;
      determine, by the reconciliation engine, if any of the entitlement constraint templates are dynamic, and in the case that no entitlement constraint templates are dynamic, copy template data and any required user input data to operational entitlement constraint records, and, in the case that any of the constraint templates are dynamic, gather required user input to dynamically complete constraint data and copy entitlement constraint template data and the gathered required user input data to operational entitlement constraint records; and associate, by the product offering database, the software offering with the contract.

2. The system as defined in claim 1 further comprising a contracts element, an entitlement element, and a payment element, all connected to the contract management system.

3. The system as defined in claim 2 further comprising a product contract administrator, a relationship editor and a constraint template builder, all connected to the catalog management system.

4. The system as defined in claim 3 further comprising a constraints element and a product offerings element, each connected to the entitlement element.

* * * * *